US012289252B2

(12) United States Patent
Chapman (10) Patent No.: US 12,289,252 B2
(45) Date of Patent: Apr. 29, 2025

(54) NETWORKING APPARATUS AND A METHOD FOR NETWORKING

(71) Applicant: CISCO TECHNOLOGY, INC., San Jose, CA (US)

(72) Inventor: Matthew Chapman, Coogee (AU)

(73) Assignee: CISCO TECHNOLOGY, INC., San Jose, CA (US)

( * ) Notice: Subject to any disclaimer, the term of this patent is extended or adjusted under 35 U.S.C. 154(b) by 742 days.

(21) Appl. No.: 17/612,453

(22) PCT Filed: May 15, 2020

(86) PCT No.: PCT/IB2020/054640
§ 371 (c)(1),
(2) Date: Nov. 18, 2021

(87) PCT Pub. No.: WO2020/234727
PCT Pub. Date: Nov. 26, 2020

(65) Prior Publication Data
US 2022/0239608 A1    Jul. 28, 2022

(30) Foreign Application Priority Data
May 22, 2019   (AU) ................................ 2019901754

(51) Int. Cl.
*H04L 49/15*   (2022.01)
(52) U.S. Cl.
CPC ..................... *H04L 49/15* (2013.01)
(58) Field of Classification Search
CPC ..................................................... H04L 49/15
See application file for complete search history.

(56) References Cited

U.S. PATENT DOCUMENTS

| 5,457,428 A | 10/1995 | Alder et al. |
| 5,953,345 A | 9/1999 | Findlater et al. |
| 6,144,714 A | 11/2000 | Bleiweiss et al. |
| 6,278,710 B1 | 8/2001 | Eidson |

(Continued)

FOREIGN PATENT DOCUMENTS

| AU | 2013101670 B4 | 1/2014 |
| EP | 1564919 B1 | 10/2006 |

(Continued)

OTHER PUBLICATIONS

Maciej Lipinski et al., "Performance results of the first White Rabbit installation for CNGS time transfer", 2012 IEEE International Symposium on Precision Clock Synchronization for Measurement, Control and Communication Proceedings. IEEE, Apr. 2012, 6 pages.

(Continued)

*Primary Examiner* — Samina F Choudhry (57) ABSTRACT

Disclosed is networking apparatus comprising: a plurality of communications ports that interface with external computing systems to channel physical layer signals; a dynamic routing module that interconnects communication ports with discrete reconfigurable data conduits, each of the data conduits defining a transmission pathway between the communications ports for physical layer signals. Each of the plurality of communication ports is paired with a receiver module which is adapted to process incoming data received at the communication port.

21 Claims, 7 Drawing Sheets

(56) References Cited

U.S. PATENT DOCUMENTS

| | | | |
|---|---|---|---|
| 8,036,202 | B2 | 10/2011 | Biederman et al. |
| 8,598,910 | B1 | 12/2013 | Leshchuk et al. |
| 8,949,448 | B1 | 2/2015 | Saxtorph |
| 9,112,632 | B2 | 8/2015 | Finn |
| 9,268,888 | B1 | 2/2016 | Leong et al. |
| 2002/0073228 | A1 | 6/2002 | Cognet et al. |
| 2003/0235216 | A1 | 12/2003 | Gustin |
| 2005/0050203 | A1 | 3/2005 | Chattopadhyay et al. |
| 2005/0207387 | A1 | 9/2005 | Middleton et al. |
| 2005/0286507 | A1 | 12/2005 | Osterling et al. |
| 2006/0007960 | A1 | 1/2006 | Liu et al. |
| 2007/0100570 | A1 | 5/2007 | Xu |
| 2008/0273521 | A1 | 11/2008 | Shao et al. |
| 2010/0074383 | A1 | 3/2010 | Lee et al. |
| 2010/0150288 | A1 | 6/2010 | Zhu et al. |
| 2011/0075685 | A1 | 3/2011 | Xu et al. |
| 2012/0139597 | A1 | 6/2012 | Blondel et al. |
| 2013/0003757 | A1 | 1/2013 | Boatright et al. |
| 2013/0121692 | A1 | 5/2013 | Patel |
| 2013/0343409 | A1 | 12/2013 | Haulin |
| 2014/0132837 | A1 | 5/2014 | Ye et al. |
| 2015/0046613 | A1 | 2/2015 | Hurd et al. |
| 2015/0134864 | A1 | 5/2015 | Foster |
| 2015/0163000 | A1 | 6/2015 | Aweya |
| 2016/0020985 | A1 | 1/2016 | Swartzentruber et al. |
| 2016/0043823 | A1 | 2/2016 | Zhao et al. |
| 2017/0064717 | A1 | 3/2017 | Filsfils et al. |
| 2017/0085422 | A1 | 3/2017 | Chapman et al. |
| 2018/0026915 | A1 | 1/2018 | Snowden et al. |
| 2018/0107579 | A1 | 4/2018 | Chapman |
| 2018/0343238 | A1* | 11/2018 | Tola ................ H04L 63/0421 |
| 2019/0306282 | A1* | 10/2019 | Masputra ............ G06F 9/44526 |

FOREIGN PATENT DOCUMENTS

| | | |
|---|---|---|
| WO | 2009029339 A1 | 3/2009 |
| WO | 2015014414 A1 | 2/2015 |

OTHER PUBLICATIONS

Pedro Moreira et al., "Distributed DDS in a White Rabbit Network: An IEEE 1588 Application", 2012 IEEE International Symposium on Precision Clock Synchronization for Measurement, Control and Communication Proceedings. IEEE, Sep. 2012, 6 pages.

Maciej Lipinski et al. "Reliability in A White Rabbit Network." Conf. Proc.. vol. 111010. No. CERN-ATS-2011-195., 13th International Conference on Accelerator and Large Experimental Physics Control Systems, Oct. 2011, 4 pages.

J. Serrano et al., "The White Rabbit Project", Proceedings of IBIC2013, Sep. 2013, 7 pages.

J. Serrano et al., "White Rabbit Status and Prospects", No. CERN-ACC-2013-0231, Oct. 2013, 4 pages.

M. Brückner et al., "A White Rabbit setup for sub-nsec synchronization, timestamping and time calibration in large scale astroparticle physics experiments", ICRC, vol. 33, Jul. 2013, 4 pages.

J. Serrano et al., "The White Rabbit Project", No. CERN-ATS-2009-096, Oct. 2009, 3 pages.

Pedro Moreira et al., "White Rabbit: Sub-Nanosecond Timing Distribution over Ethernet", 2009 International Symposium on Precision Clock Synchronization for Measurement, Control and Communication, IEEE, Oct. 2009, 5 pages.

M. Bruckner, et al. "Results from the WhiteRabbit sub-nsec time synchronization setup at HISCORE-Tunka." Proceedings of the 33rd International Cosmic Rays Conference, ICRC 2013, Jul. 2013, 4 pages.

Pietro Fezzardi et al., "PPSi—A Free Software PTP Implementation", 2014 IEEE International Symposium on Precision Clock Synchronization for Measurement, Control, and Communication (ISPCS), IEEE, 2014, 6 pages.

Maciej Lipinski et al. "White rabbit: A PTP application for robust sub-nanosecond synchronization", 2011 IEEE International Symposium on Precision Clock Synchronization for Measurement, Control and Communication, IEEE, Sep. 2011, 6 pages.

M. Lipiński et al., "White Rabbit Applications and Enhancements", Precision Clock Synchronization for Measurement, Control, and Communication (ISPCS), 2018 IEEE International Symposium Proceedings 978-1-5386-4262-7, Oct. 3-5, 2018, 8 pages.

Opher Ronen, "Enhanced synchronization accuracy in IEEE1588," 2015 IEEE International Symposium on Precision Clock Synchronization for Measurement, Control, and Communication (ISPCS), IEEE, Oct. 2015, 7 pages.

V. Di Capua et al., "Real-Time Magnetic Measurement Monitoring under cRIO-LabVIEW Based Platform", ISPCS, Sep. 2018, 5 pages.

Mattia Rizzi et al., "White Rabbit clock characteristics", 2016 IEEE International Symposium on Precision Clock Synchronization for Measurement, Control, and Communication (ISPCS), IEEE, Sep. 2016, 6 pages.

Grzegorz Daniluk et al., "White Rabbit: Sub-Nanosecond Synchronization for Embedded Systems", Proceedings of the 43rd Annual Precise Time and Time Interval Systems and Applications Meeting, Nov. 2011, 15 pages.

Javier Serrano, "Small or medium-scale focused research project (STREP) proposal ICT Call 5", FP7-ICT-2009-5, Strep proposal White Rabbit, Oct. 23, 2009, V. 1, 80 pages.

IEEE, "IEEE Standard for a Precision Clock Synchronization Protocol for Networked Measurement and Control Systems", IEEE Std 1588™-2008, Jul. 24, 2008, 289 pages.

Cota, Emilio G. et al., "White Rabbit Specification: Draft for Comments", Version 2.0, Jul. 2011, 69 pages.

Daniluk, Grzegorz, "White Rabbit calibration procedure", Version 1.1, Nov. 9, 2015, 32 pages.

Jansweijer, P.P.M. et al., "Measuring propagation delay over a 1.25 Gbps bidirectional data link", National Institute for Subatomic Physics, The Netherlands, May 31, 2010, 24 pages.

Moreira, Pedro et al., "Digital Dual Mixer Time Difference for Sub-Nanosecond Time Synchronization in Ethernet", Frequency Control Symposium, Jun. 2010, 5 pages.

Wlostowski, Tomasz et al., "Precise time and frequency transfer in a White Rabbit network", Apr. 2011, 98 pages.

Eidson, John C., "Measurement, Control, and Communication Using IEEE 1588," Chapters 3, 4, 5 & 8), ISBN 978-1-84628-251-5, Mar. 9, 2006, 161 pages.

Holmeide, Øyvind et al., "Synchronised Switching", IET Computing & Control Engineering, Apr./May 2006, 7 pages.

Lee, Kang et al., "Workshop on IEEE-1588, Standard for a Precision Clock Synchronization Protocol for Networked Measurement and Control Systems", Sep. 24, 2003, 154 pages.

Extended European Search Report in counterpart European Application No. 20808809.6, mailed Dec. 20, 2022, 11 pages.

International Search Report and Written Opinion in counterpart International Application No. PCT/IB2020/054640, mailed Aug. 14, 2020, 12 pages.

Office Action for counterpart Australian Application No. 2020280261, dated Nov. 4, 2024, 3 pages.

\* cited by examiner

NETWORKING APPARATUS AND A METHOD FOR NETWORKING

TECHNICAL FIELD

The disclosure of this specification relates generally to low latency data communications, and more particularly (but not exclusively) to a reconfigurable networking system and a method for low latency networking.

BACKGROUND ART

Communication latency is a measure of delay between releasing communication transmissions and the transmissions being received. Latency in data communication networks is introduced by physical limitations of the networking equipment (including transmission mediums) and transmission signal processing procedures implemented during sending and receipt. The latency of communications may, in some applications, be an important factor in securing a desired outcome. For example, being the first to have a complete electronic trade order received by a stock exchange can establish trade priority. Advantage can then be taken of favourable prices for financial instruments, such as shares, derivatives and futures. Being the first to receive market information may enable a trader to take advantage of favourable market conditions before others. In another example, the outcome of a networked electronic game for an individual player may be determinant on the latency of gaming commands transmitted across the network. Being able to send a low latency instruction to place a wager or a bid at an auction, for example, may increase the probability of securing good odds, a good price, or a successful purchase.

It is to be understood that, if any prior art is referred to herein, such reference does not constitute an admission that the prior art forms a part of the common general knowledge in the art, in Australia or any other country.

SUMMARY

Aspects of the invention are set out in the independent claims and preferred features are set out in the dependent claims. Features of one aspect may be applied to each aspect alone or in combination with other aspects.

In one aspect, the present invention provides a networking apparatus comprising: a plurality of communications ports that interface with external computing systems to channel physical layer signals, a dynamic routing module that interconnects communication ports with discrete reconfigurable data conduits, each of the data conduits defining a transmission pathway between the communications ports for physical layer signals;

each of the plurality of communication ports being paired with a receiver module which is adapted to process incoming data received at the communication port.

A connection between each communication port and its corresponding receiver module can be parallel to a connection between the communication port and the routing module.

The receiver module can be at least partially provided separately to the routing module.

The receiver module can include a matching block which is adapted to process the incoming data packet a higher level than the physical layer, and a separate matching block is paired with each communication port.

The networking apparatus can further include a control block in connection with each matching block, adapted to receive processed data from the matching block.

The control block can be adapted to extract physical layer information from the received processed data, so as to reconfigure the data conduits to select the transmission pathway, according to the physical layer information.

The receiver module can be adapted to parse the incoming data packet to extract a datagram.

The datagram can be or can comprise one of the following: an Internet Group Management Protocol packet; an Address Resolution Protocol packet; a Link Layer Discovery Protocol packet.

The datagram can be part of a protocol that allows a sender of the datagram to request the making and/or breaking of the data conduits.

The datagram can be a network management or network discovery packet.

The data conduits can be reconfigured in response to the datagrams.

The apparatus can include a crosspoint switch that establishes the data conduits between the communications ports and redirects physical layer signals between interconnected communications ports, the crosspoint switch being integrated with the dynamic routing module.

In another aspect, the present invention comprises a networking method comprising:
  receiving incoming data at a communication port in the networking apparatus;
  processing the incoming data to obtain a physical layer information;
  establishing a physical layer discrete data conduit, responsive to the physical layer information, the data conduit interconnecting the communications port with a target communications port.

The networking method can further include routing the physical layer signals from the incoming data through the discrete data conduit to a target communications port.

The incoming data can be taken from a connection between the communication port and a routing module, to be processed by a receiver module.

In a further aspect, the invention provides a network, optionally a financial market network, comprising:
  a networking apparatus with a plurality of communications ports and a dynamic routing module that reconfigurably interconnects communications ports with discrete data conduits,
  each of the plurality of communication ports being paired with a receiver module which is adapted to process an incoming data received at the communication port, to select a transmission pathway in a physical layer for the incoming data.
  a broadcast server, optionally a financial broadcast server, that disseminates information, optionally market information, the broadcast server being interfaced with a service port of the networking apparatus communications ports,
  a plurality of client computing systems that receive information from the broadcast server, the client systems being interfaced to client communications ports of the networking apparatus, and
  a plurality of data conduits that define transmission pathways between the service communications ports and the client communications ports to facilitate transmission of physical layer signals.

BRIEF DESCRIPTION OF THE DRAWINGS

Embodiments will now be described by way of example only, with reference to the accompanying drawings in which.

DETAILED DESCRIPTION

In the following detailed description, reference is made to accompanying drawings which form a part of the detailed description. The illustrative embodiments described in the detailed description, depicted in the drawings and defined in the claims, are not intended to be limiting. Other embodiments may be utilised and other changes may be made without departing from the spirit or scope of the subject matter presented. It will be readily understood that the aspects of the present disclosure, as generally described herein and illustrated in the drawings can be arranged, substituted, combined, separated and designed in a wide variety of different configurations, all of which are contemplated in this disclosure.

A low latency networking apparatus is disclosed in this specification. The device functions at layer 1 of the Open Systems Interconnection (OSI) model to channel physical layer signals between computing systems without processing signal metadata (such as packet headers). This reduces transmission latency by removing processing overheads associated with higher layer signal transmission protocols (such as TCP/IP and UDP).

The Applicant has previously disclosed networking devices which implements 'data agnostic' signal channelling processes, which operate directly on physical layer signals, enabling the networking device to channel data transmissions that adhere to different transmission protocols without prejudice. These are described in Patent Cooperation Treaty applications PCT/AU2013/000404 and PCT/AU2015/000311, the contents of which are incorporated herein by reference.

The networking device channels physical layer signals through preconfigured pathways (termed 'data conduits'), instead of determining the destination of a transmission from metadata associated with the signal. This avoids metadata detection and decoding procedures associated with higher layer transmission protocols. Physical layer signals are directed from a source communications port to a destination communications port using preconfigured data conduits. The signal may be channelled to a plurality of destination ports in 'one-to-many' routing configurations.

The disclosed networking device comprises a plurality of communications ports that interface with external computing systems to channel physical layer signals. A dynamic routing module interconnects the communications ports with discrete reconfigurable data conduits. Each of the data conduits defines a transmission pathway between predetermined communications ports for physical layer signals. This enables the physical layer signals to be channelled from one computing system to another computing system with low transmission latency. The signals may be channelled to a plurality of computing systems in 'one-to-many' routing configurations.

In the networking device disclosed in PCT/AU2013/000404, the networking device incorporates a management module that maintains the data conduits. The management module receives routing commands from an external computing system and manipulates the data conduits based on the received commands. The received commands are thus separate from the data packets being transmitted via the physical layer data conduits, or "out of band". The routing commands are independent of the physical layer signals being channelled by the networking device. The management module interfaces with the dynamic routing module to make and/or break data conduits responsive to received routing commands.

A crosspoint switch is typically integrated with the routing module to establish data conduits between predetermined communications ports. The crosspoint switch may incorporate semiconductor switches, optical splitters and/or other components to facilitate signal transmission. The management module controls the crosspoint switch to redirect physical layer signals between the communications ports. The crosspoint switch creates suitable connections (such as electrical or optical pathways) between the respective ports.

In the currently disclosed networking device, the management information is supplied directly to the data ports of the physical layer. The separate management module is not required, although it can be included.

Figure 1:
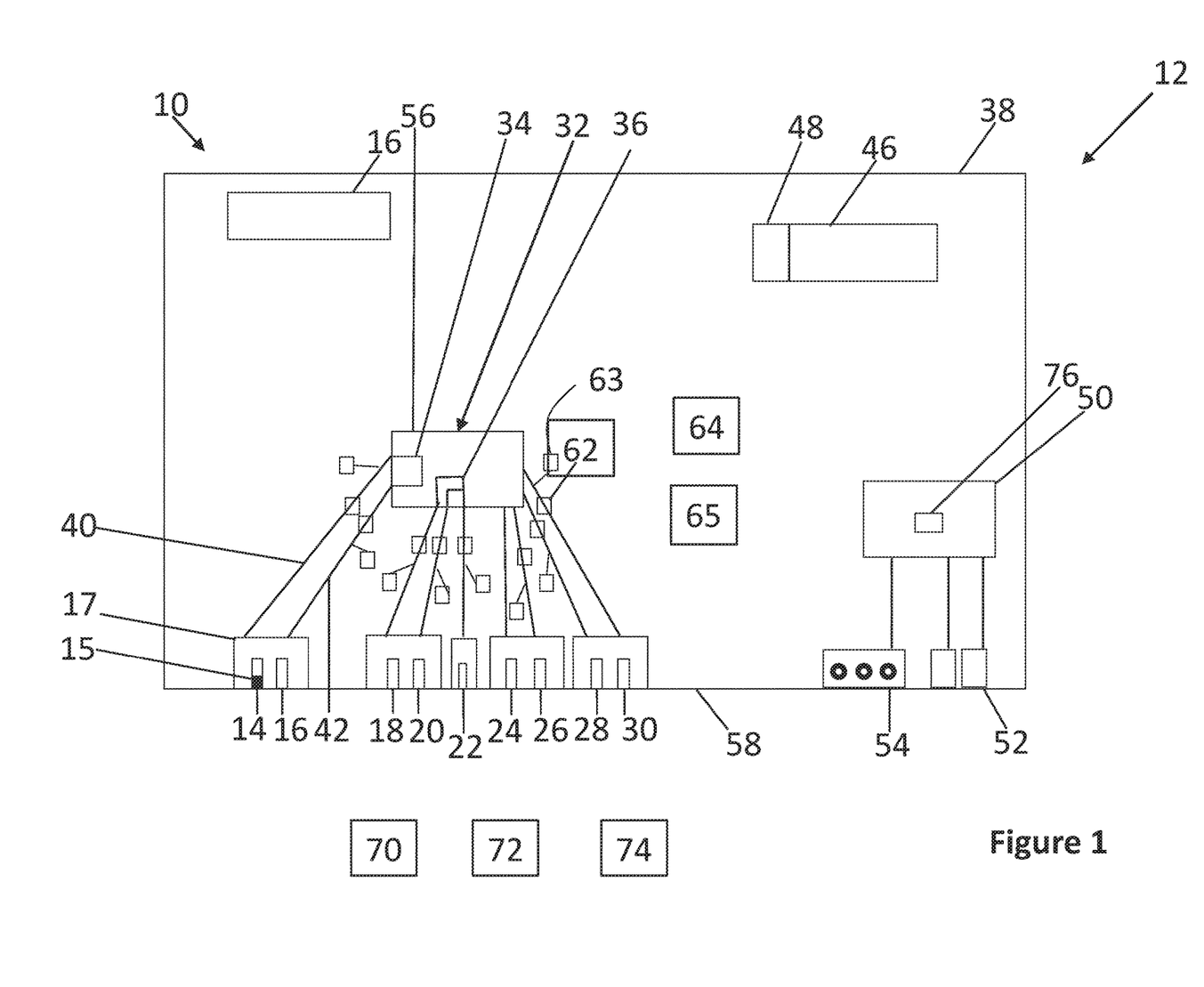
FIG. 1 is a schematic diagram of an embodiment of a networking apparatus in accordance with an embodiment of the invention.

FIG. 1 shows a schematic diagram of an embodiment of a networking device for use in a data network 12. The networking device 10 can be implemented in a variety of networks, including wide area networks such as the internet, an Ethernet network or Infiniband™ network. The illustrated networking device 10 has a plurality of communication ports, generally identified by reference numerals 14 to 30. The communications ports 14 to 30 convey data signals between components that are connected to the networking device.

The networking device incorporates a dynamic routing module 32 that channels physical layer signals between the communications ports. The routing module 32 establishes reconfigurable data conduits between the communication ports 14 to 30 to facilitate signal transmissions. Each data conduit interconnects at least two communications ports.

The routing module 32 shown in FIG. 1 is configured to connect ports 14 and 16 in a 'one-to-one' routing configuration with a dedicated data conduit 34. The networking device 10 can facilitate both unidirectional and bidirectional data channeling in 'one-to-one' routing configurations. The routing module 32 may also establish 'one-to-many' port configurations with conduits that interconnect more than two ports. A 'one-to-many' routing configuration is also depicted in FIG. 1, with ports 18, 20 and 22 interconnected by conduit 36. 'One-to-many' routing configurations are typically used where data distribution equality is important as the signal is simultaneously channelled to each destination computing system with negligible discrimination. The networking device 10 is restricted to unidirectional data channelling in 'one-to-many' routing configurations. In prior art devices, higher level signal interpretation can require logical operations that introduce latency.

The connections, or data conduits, established by the routing module 32 are readily reconfigurable. The routing module 32 and communications ports 14 to 30 are arranged to operate at layer 1 of the Open Systems Interconnection (OSI) model (true physical-layer networking). Consequently, the networking device 10 is protocol independent ("protocol agnostic"). In the prior art, existing 'physical layer' devices often incorporate higher level signal interpretation (such as retrieving header information from transmitted signals) despite claiming 'physical layer' or 'layer 1' operation.

Embodiments of the layer 1 networking device 10 disclosed in this specification are capable of operating over a wide range of bit rates. For example, the networking device 10 may be compatible with any one of 10BASE5 Ethernet bit rate, 10BASET Ethernet bit rate, Fast Ethernet, Gigabit Ethernet, 10 Gigabit Ethernet and 100 Gigabit Ethernet.

Each communication port (14 to 30) is paired with (i.e. interfaced with or coupled to) a matching block 63. As data packets arrive at a communication port, they are sent to the matching block 63 paired with that communication port. The matching block 63 is generally a logic module, where higher level signal interpretation, using the internal logic in the matching block 63, is performed. The matching blocks 63 are in connection with a control block 65, which receives the signal interpretation and/or applies higher level interpretation in order to obtain physical layer information regarding the destination for the data packet. The connection between the matching blocks 63 and the control block 65 can be provided by tracks on the printed circuit board for the networking apparatus 10.

The control block 65 then reconfigures the crosspoint switch layer to provide the appropriate conduit according to the physical layer information, if required. Reconfiguration may not be required, e.g., in cases where the crosspoint switch already provides the suitable conduit. In the embodiment shown in FIG. 1, a single control block 65 is provided for the data routing module 32. It is conceivable that multiple control blocks 65 can be included.

More details regarding the matching block 63 and the control block 65 are explained below.

Each matching block 63 is adapted to extract and categorise datagrams (data packets) from the network signal. The datagrams include various sub-fields such as headers, data payload, trailer, etc. The logic algorithm or module 63 categorises the datagrams by identifying parameters in the data. For example, it is adapted to detect the presence of a predefined parameter or one of a plurality of predefined parameters. In some embodiments, the predefined parameters are programmable, and the matching block 63 is thus programmable to identify different datagrams. In one implementation, the matching block 63 is programmed to be able to detect the communication protocols of the data packets arriving at a communication port, by looking up the received parameters representing an identifier for the protocol, in an internal lookup table.

For example, in one embodiment where the network is an Ethernet (IEEE 802.3) network, the matching block 63 includes a logic module which implements the physical layer (PHY) and media access control (MAC) layers of the Ethernet specification in order to extract the data packet from the signal. The extracted data packet is then further processed for identification. For instance, the signal information relating to the protocol identifier parameter is recognised as a parameter identifying the protocol type. The value of the parameter is then used to identify the protocol type. Similarly, the media access control definition also allows the matching block 63 to identify the data payload or data body in the data packet.

The matching block, or the logic module, 63 is located somewhere between the communication port and routing module 32 containing or integrated with the crosspoint switch. In one embodiment, the matching block 63 is located at the input of its corresponding crosspoint switch, e.g. as a branch which taps from the signal provided to the crosspoint switch input. In another embodiment, the matching block 63 is located in a chip separate to the crosspoint switch. Two or more of the matching blocks 63 included in the device 10 may be located in the same chip.

The matching block 63 is placed such that it is arranged in parallel with the high-speed physical layer path (i.e. crosspoint switch). That is, the connection between the input communication port and the corresponding matching block 63, and between the input communication port and the input to the crosspoint switch associated with the communication port, are parallel to each other. This parallel connection allows the low latency benefits of physical layer networking (as taught in PCT/AU2013/000404) to be preserved. The physical layer networking aspect of the invention also differentiates it from a conventional network switch which does not involve physical layer networking.

The data payload or body which is identified by the matching block 63 is further processed by the control block 65.

Generally, in the matching block, when an incoming network datagram matching certain (generally programmable) parameter is identified, it is forwarded to the control block. Particularly, the data payload or body which is identified and/or extracted by the matching block 63 is forwarded to the control block 65. This information may be forwarded on its own, or along with the remaining datagrams in the packet. The payload or body datagram is then further parsed or decoded by the internal logic in the control block 65 into various fields to extract physical layer information regarding the target or destination. If required, the control block 65 reconfigures the crosspoint fabric (i.e. makes or breaks connection to form a conduit), in response to the detected contents of the datagram.

In one typical embodiment, the control block may be in a separate chip such as a microcontroller or microprocessor. In another embodiment, the control block 65 may be located on the same chip as the matching block(s) 63.

In the above, it is preferred that the matching block(s) 63 and the control block 65 are programmed to only listen for, i.e. monitor, datagrams containing the required information for the mapping of the conduit in the physical layer.

Therefore, the networking device 10 allows a networking method that allows an "in band" reconfiguration of the crosspoint switch. This may be done in response to management commands received on a data port. Additionally or alternatively, it may be done automatically, in response to the receipt of certain types of network traffic on a data port. The processing performed by the matching blocks 63 and the control block 65 enables the networking device 10 to learn the conduit configuration required. Automatically performing switch configuration reduces the burden on the network administrator.

FIGS. 2 to 7 depict examples which illustrate how the above explained networking apparatus and method reconfigures the crosspoint switch layer, given different types of data packets.

Figure 2:
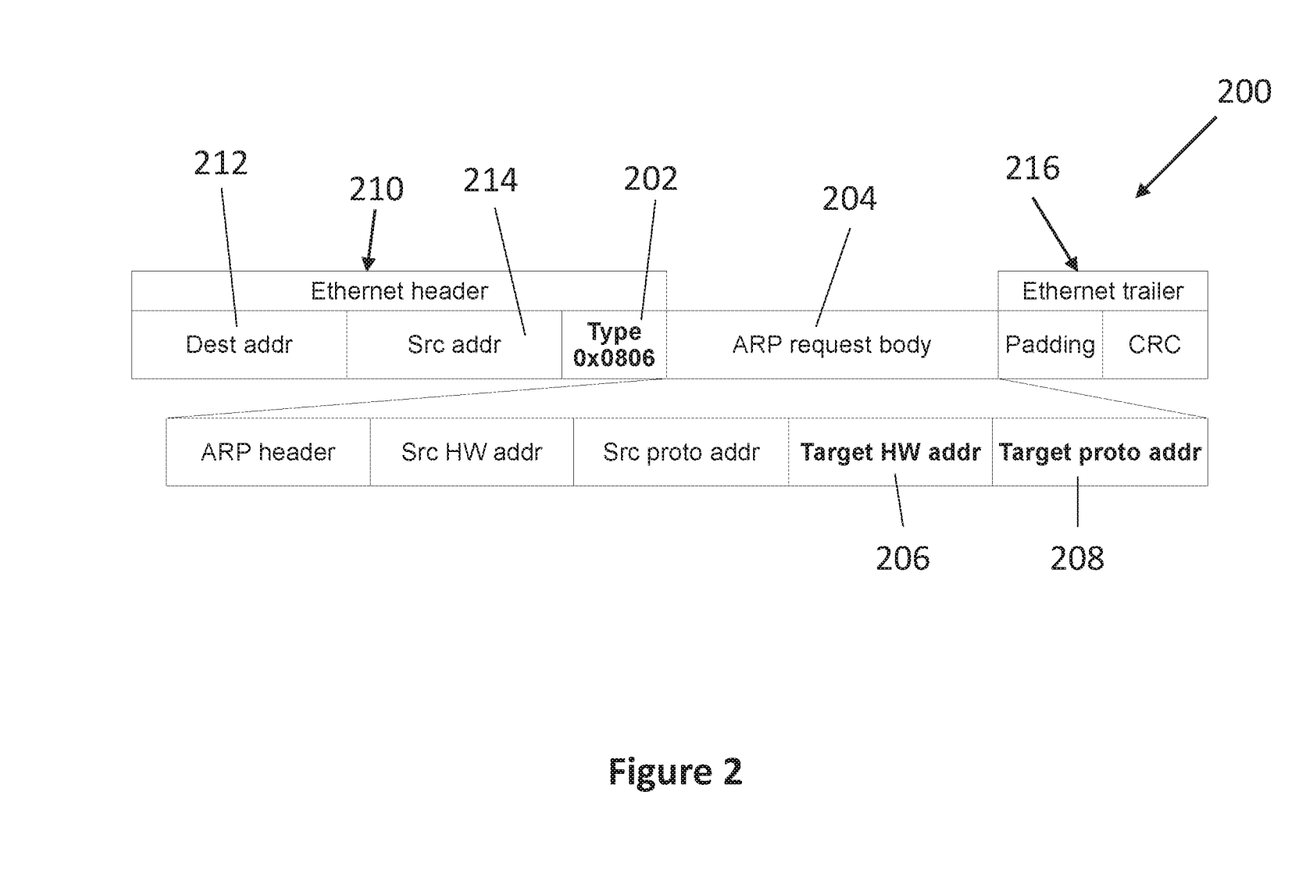
FIG. 2 is an example Address Resolution Protocol (ARP) data packet.
Figure 3:
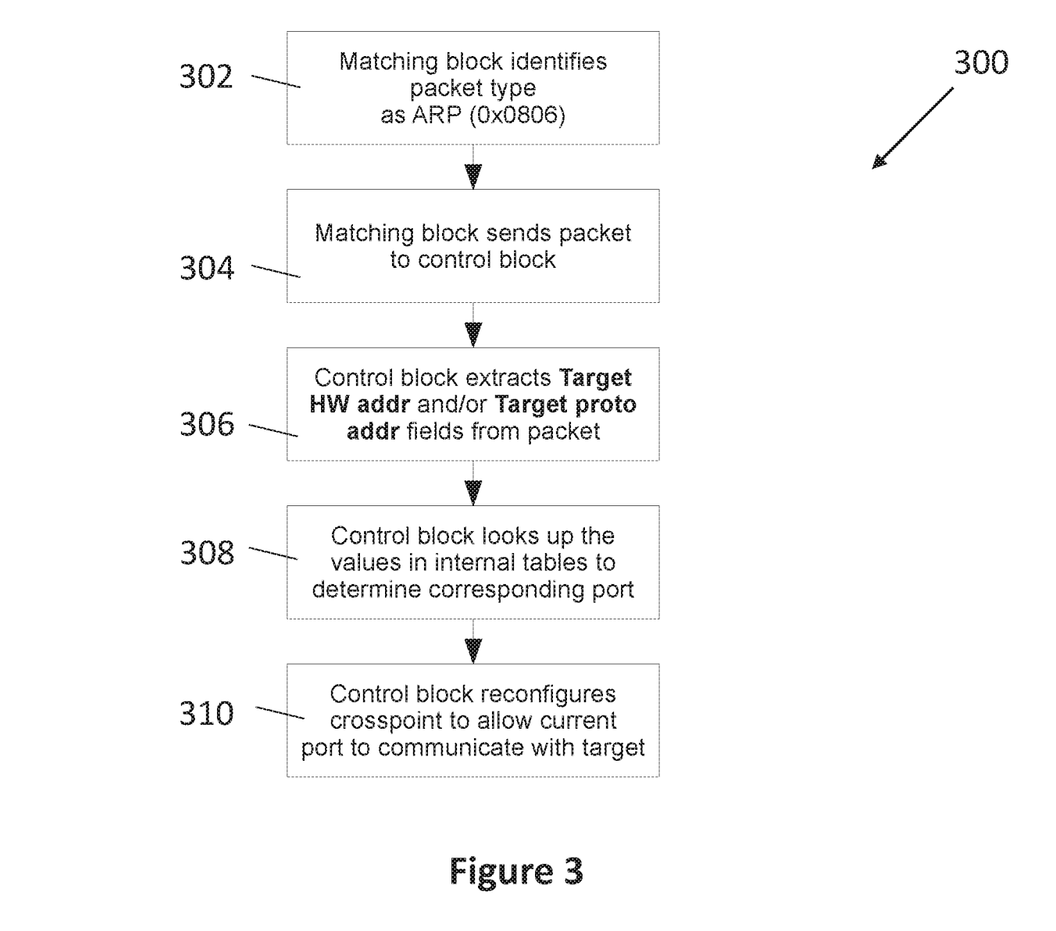
FIG. 3 is an example process of handling the ARP data packet in accordance with an embodiment of the present invention.
Figure 4:
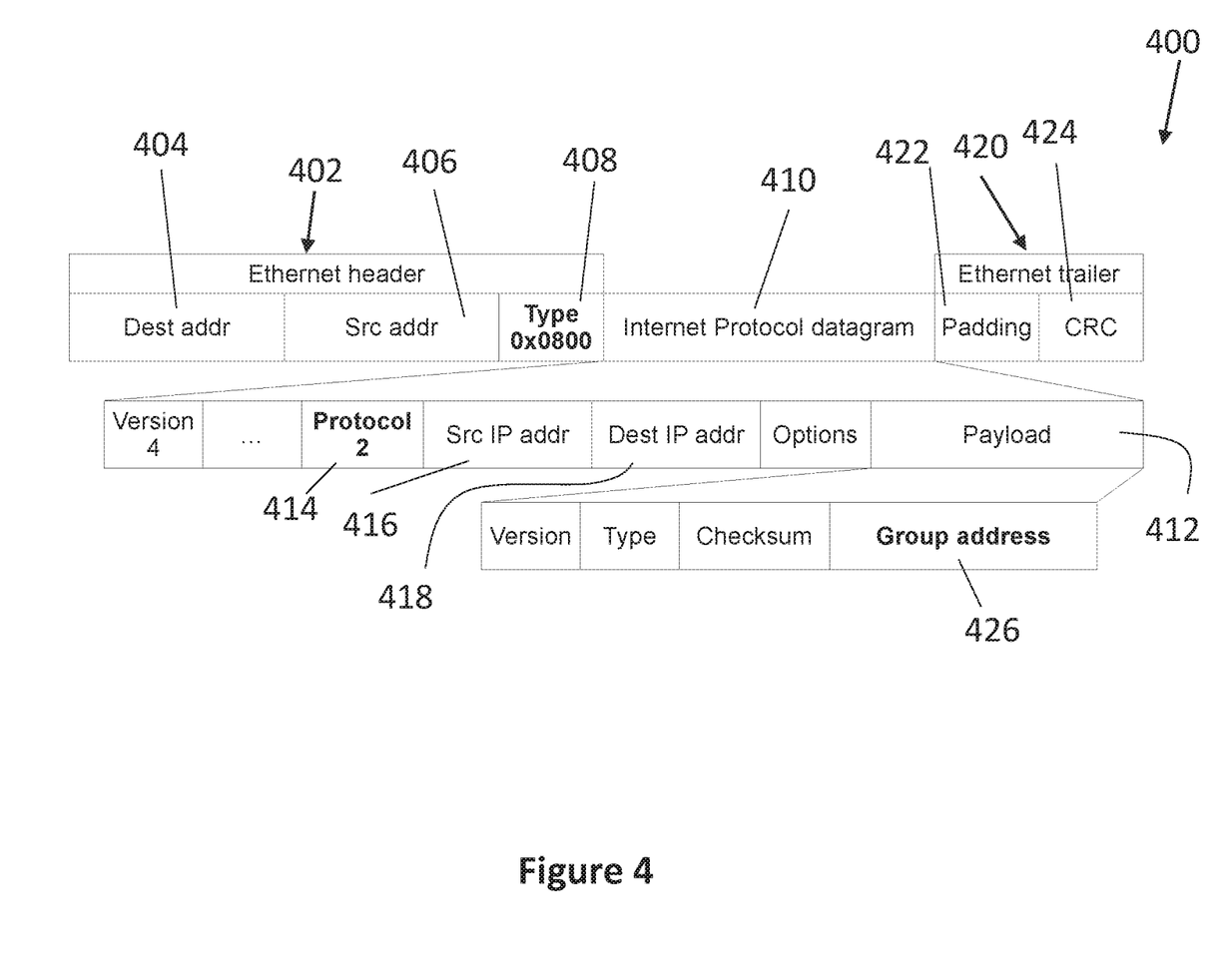
FIG. 4 is an example Internet Group Management Protocol (IGMP) data packet.
Figure 5:
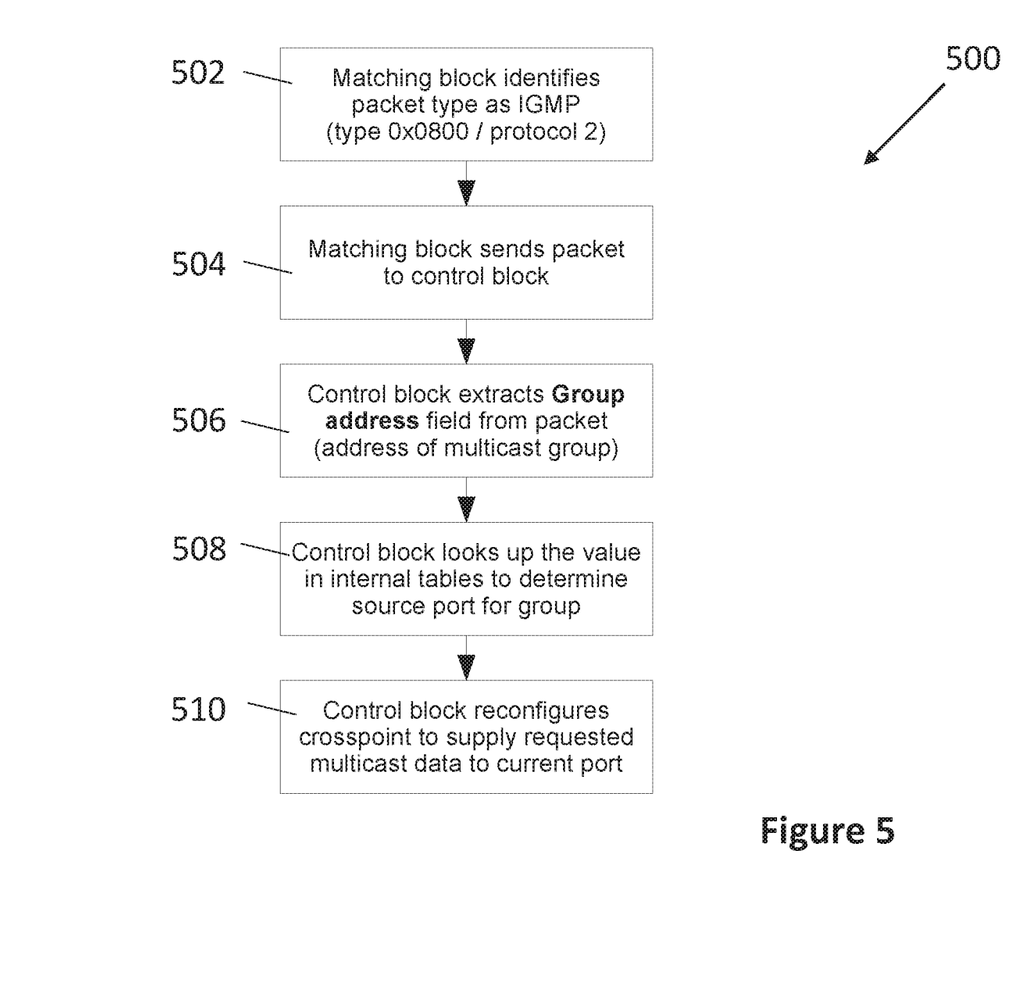
FIG. 5 is an example process of handling the IGMP data packet in accordance with an embodiment of the present invention.

As illustrated, the matching block 63 may be configured to detect one or more standard protocols, such as Address Resolution Protocol (ARP) as shown in FIGS. 2 and 3, or Internet Group Management Protocol (IGMP) as shown in FIGS. 4 and 5. These protocols are used in the process of establishing communication with other hosts.

An example of an ARP packet 200 is shown in FIG. 2. It is identified by the Ethernet type field parameter 202, which for the case of ARP is "0x0806". The Ethernet type field 202 is part of the Ethernet header 210, which also includes a destination Ethernet address 212 and a source Ethernet address 214. The remainder of the data packet 200 is the Ethernet trailer 216 which may include padding 218 and/or a frame check sequence 220 such as a cyclic redundancy check.

The matching block 63 is programmed to be able to identify that the incoming data packet is an ARP packet, by matching the Ethernet type field 202 to the known value for the Ethernet type field for ARP. The matching block 63 also identifies the body 204 of the ARP data packet. Data including the body 204 of ARP data packet is forwarded to the control block 65, which is programmable to identify the contents required for the routing of data packets transmitted using different communication protocols.

The programmable control block 65 extracts the target hardware address 206 and/or the target protocol address 208, and uses internal tables to determine which physical port of the switch 10 needs to be connected to the communication port which received the incoming ARP packet 200. The control block 65 then reconfigures the crosspoint switch so that the current port becomes connected to the target port.

FIG. 3 depicts a flow chart of an example handling process 300 of the ARP data packet 200. In step 302, the matching block 63 identifies that the incoming data packet is an ARP packet, by recognising the ARP packet type field "0x0806". In step 304, the matching block 63 sends the data packet to the control block 65. In step 306, the matching block 65 parses the data packet in order to extract the target address fields 206, 208 from the packet. In step 308, once the values of the target address fields 206, 208 are identified, the control block 65 then looks up these values in an internal table to ascertain the port which corresponds to the values of the target address fields 206, 208. In step 310, the control block 65 reconfigures the crosspoint switch layer to allow the data packet to be communicated over the crosspoint switch layer, by making or breaking connections—if there is no existing data conduit connecting the port receiving the incoming data with the port corresponding to the target address values.

FIG. 4 depicts an example of an IGMP packet 400 which is used for the management of multicast communications. The IGMP packet 400 includes an Ethernet header 402 which comprises a destination Ethernet address 404, a source Ethernet address 406, and the Ethernet type field 408. The matching block 63 first identifies that the incoming data packet is an IP packet, by recognising the value of Ethernet type field 408 as the known value for IP packets, which is "0x0800".

An internet protocol datagram 410 includes the data to be communicated (i.e. payload 412), plus intermediate level protocol information 414 and routing information, such as the intermediate level source internet protocol source address 416 and the intermediate level source internet protocol destination address 418. The matching block identifies that the incoming data packet is an IGMP packet, by recognising the value of the protocol field 414 as the known value for IGMP packets, which is "2". The remainder of the data packet 400 is the Ethernet trailer 420 which may include padding 422 and/or a frame check sequence 424 such as a cyclic redundancy check.

The data packet 400, or at least the payload 412, is forwarded to the control block 65. The control block 65 parses the payload 412 to identify the lower level, target group address 426 for the target multicast group. The target address 426 is then matched with an entry in the internal table to determine the corresponding target data port.

FIG. 5 depicts a flow chart of an example handling process 500 of the IGMP data packet 400. In step 502, the matching block 63 identifies that the incoming data packet is an IP protocol packet, by recognising the Ethernet packet type field "0x0800". By recognising the parameter identifying the data packet 400 as an IP data packet, the logic included the matching block 63 then continues to parse the internet protocol datagram to identify the protocol field, which in this case is "2" for IGMP.

In step 504, the matching block 63 then sends the data packet, or at least the payload to the control block 65. In step 506, the matching block 65 parses the payload 412 in order to identify the group address fields 426 from the packet. In step 508, once the value of the group address field 426 is identified, the control block 65 then looks up this value in an internal table to ascertain the corresponding port to be the source port for the multicast group. In step 510, the control block 65 reconfigures the crosspoint switch layer to make a data conduit to connect the current port where the IGMP packet 400 is received, to the source port—if this conduit does not already exist or is not already open in the crosspoint switch layer.

In the above, while ARP and IGMP are provided as common examples, it should be understood that other protocols may be substituted to achieve a similar goal. For instance the networking device can also be adapted to process Link Layer Discovery Protocol packets.

Figure 6:
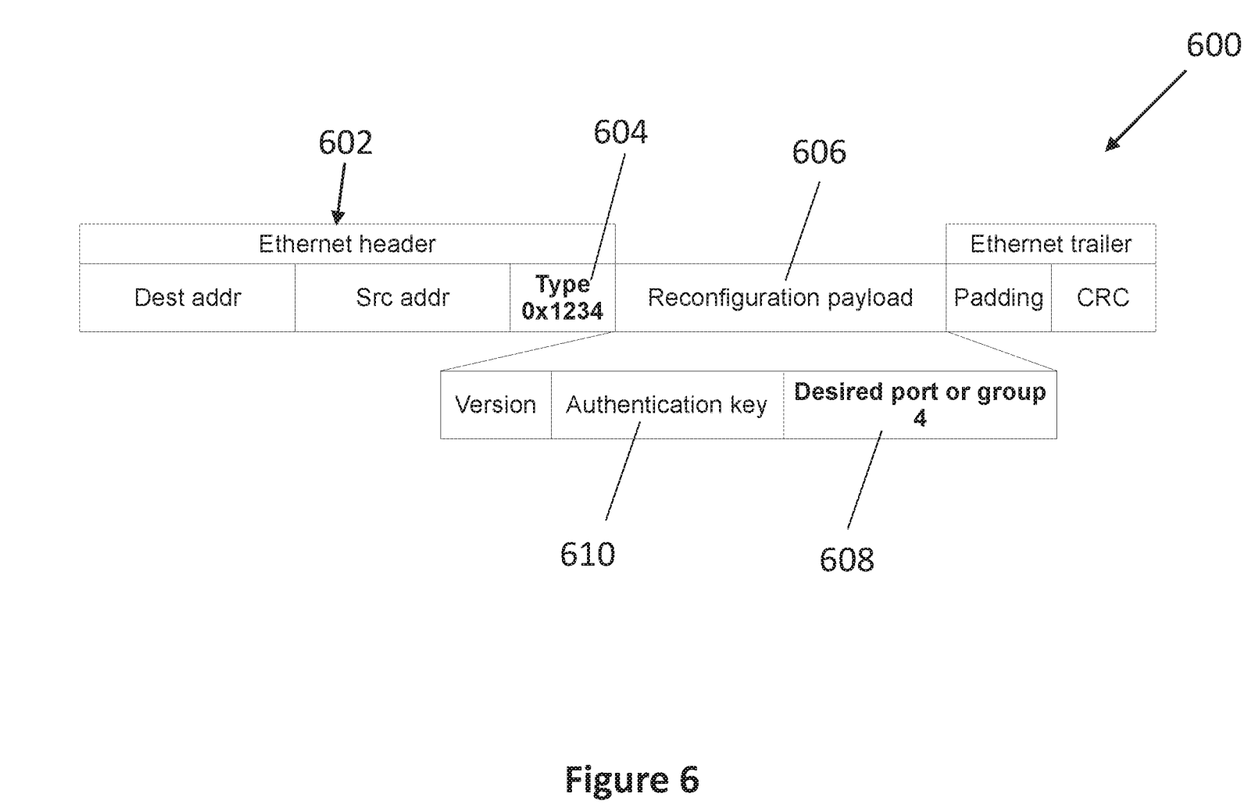
FIG. 6 is an example direct reconfiguration data packet.
Figure 7:
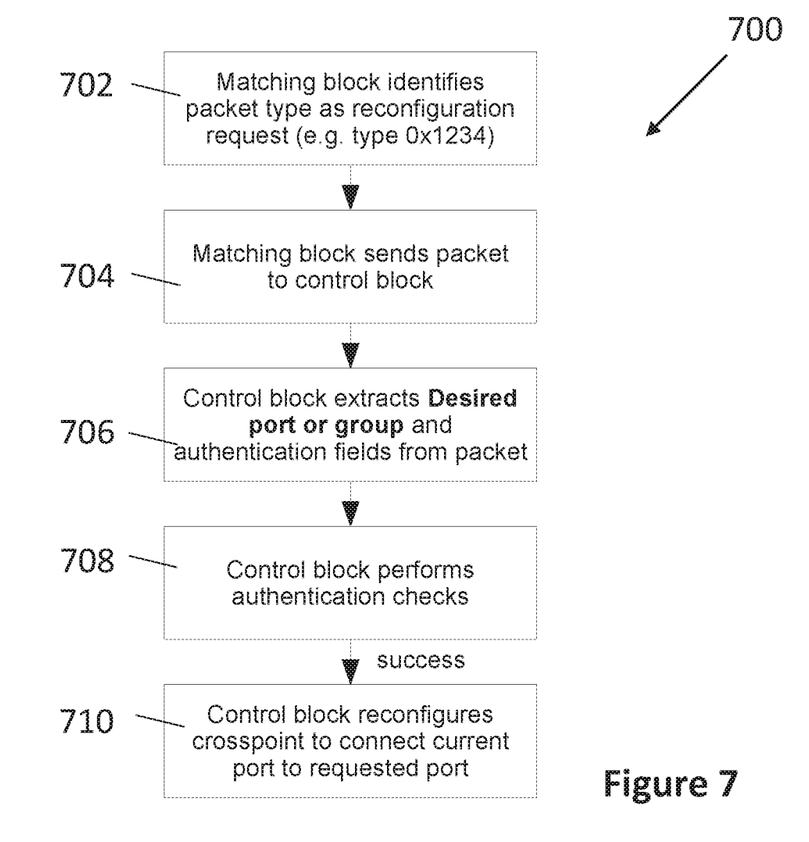
FIG. 7 is an example process of handling the direct reconfiguration data packet in accordance with an embodiment of the present invention.

In the embodiment shown in FIGS. 6 and 7, the datagram that the matching block 63 searches for is a format specifically defined for the management of the crosspoint switch. For example, the matching block 63 is adapted to identify the Ethernet type field 604 in the Ethernet header 602, and recognise that the packet 600 is a specifically formatted management packet upon ascertaining that the value of the Ethernet type field 604 is the predetermined value for the management packet, e.g., "0x1234". The payload data 606 included in the management data packet is, e.g., a reconfiguration payload. The programmable control block 65 parses the payload data 606 to identify the parameter corresponding to the desired port or group, and then reconfigures the network switch based on the identified parameter. In the depicted case, the port where the packet was received is connected to port 4 of the switch, as the value of the "desired port or group" field is "4".

FIG. 7 depicts a flow chart of an example handling process 700 of the management data packet 600. In step 702, the matching block 63 identifies that the incoming data packet is a management data packet 600, by recognising the management packet type field value "0x1234". In step 704, the matching block 63 then sends the data packet, or at least the payload 606 to the control block 65. In step 706, the matching block 65 parses the payload 606 in order to identify the "desired port or group" field 608 from the payload 606 and obtain the field value. Unlike the previous examples shown in FIGS. 2 to 5, the field value "4" already directly identifies the desired port for connection. In step 708, the control block 65 performs an authentication check—e.g., by checking for an authentication key 610 (see FIG. 6) which will be a data field in the payload 606. Other means of authentication can be performed, such as a handshake—however the skilled addressee will balance various authentication mechanisms with the security need of the application, and the latency which the more involved authentication protocols may involve. In step 710, once the control block 65 successfully authenticates the management data, it reconfigures the crosspoint switch layer to make a data conduit to connect the current port where the management packet 400 is received, to the desired destination port "4".

Variations and modifications may be made to the parts previously described without departing from the spirit or ambit of the disclosure.

For example, as already mentioned, the use of the matching block to include higher level (than the physical layer) processing, and then using a control block to determine and reconfigure the physical route needed—can be applied to data packets of different protocols. The matching block 63 can thus be considered to be a part of a receiver module which performs processing at a higher level than the physical layer. Depending on the implementation, the control block 65 may also be considered part of the receiver module.

The matching block and the control block can be programmable, e.g. by programming a microchip or microprocessor, so that they can have the ability to process the data packets of various protocols, allowing the networking switch 10 to be protocol agnostic.

The matching and control blocks 63, 65 thus are adapted to only recognise, or "listen for", specific types of datagrams or parameters, depending on what is included in the programming for these blocks. Preferably, the matching blocks 63 and the control block 65 do not listen for datagrams which do not include information which is needed for the physical routing reconfiguration.

As also mentioned above, the location of the matching block can be varied, as long as it receives the incoming data packet from the receiving port, in parallel with the data packet being received by the crosspoint switch layer.

There can be variations in the transmission of the signal from the matching block 63 to the control block 65. For instance, the matching block 63 may only output the datagram or payload data which can be parsed to identify the hardware level address or port information, to the control block 63. The matching block 63 may alternatively output a larger portion of the received data packet than the aforementioned datagram or payload to the control block.

As explained in PCT/AU2013/000404 and PCT/AU2015/000311, the low latency transmission enabled by the physical layer transmission is particularly applicable in latency sensitive applications, such as financial applications. Thus the networking apparatus can be integrated as part of a financial market network, where the communication ports are interfaced with e.g., a financial broadcast server which disseminates market information, and client computing systems that received the market information. The broadcast server and/or the client computing systems can have service ports in the networking apparatus, so that the physical layer signals can be transmitted between the port for the financial broadcast server and the ports for the client computing systems.

In summary, disclosed is networking apparatus comprising: a plurality of communications ports that interface with external computing systems to channel physical layer signals; a dynamic routing module that interconnects communication ports with discrete reconfigurable data conduits, each of the data conduits defining a transmission pathway between the communications ports for physical layer signals. Each of the plurality of communication ports is paired with a receiver module which is adapted to process incoming data received at the communication port.

The skilled addressee will understand that the application of the current invention is not limited to financial applications. Embodiments may be applied to any application where low latency may be useful In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

What is claimed is:

1. A networking apparatus comprising:
a plurality of communication ports that interface with external computing systems to channel physical layer signals;
a dynamic routing module that interconnects communication ports with discrete reconfigurable data conduits, each of the data conduits defining a transmission pathway between the communication ports for physical layer signals;
each of the plurality of communication ports being paired with a corresponding receiver module which is adapted to process incoming data received at an associated communication port, each receiver module including a plurality of matching blocks each paired with a corresponding communication port, each matching block configured to process the incoming data at a higher level than a physical layer; and
a control block in connection with each matching block, the control block adapted to extract physical layer information from processed data obtained from a respective matching block, and to reconfigure the data conduits to select the transmission pathway according to the physical layer information.

2. The networking apparatus of claim 1, wherein a connection between each communication port and its corresponding receiver module is parallel to a connection between the communication port and the dynamic routing module.

3. The networking apparatus of claim 1, wherein the receiver module is at least partially provided separately to the dynamic routing module.

4. The networking apparatus of claim 1, wherein the control block is adapted to extract physical layer information from the processed data to derive data conduit configuration from the incoming data to reconfigure the data conduits to select the transmission pathway, according to the physical layer information.

5. The networking apparatus of claim 4, wherein each receiver module parses the incoming data to extract a datagram that is provided to the control block, and wherein the control block is programmable to identify contents of the datagram for routing of data packets among the data conduits.

6. The networking apparatus of claim 5, wherein the datagram is or comprises one of the following: an Internet Group Management Protocol packet; an Address Resolution Protocol packet; a Link Layer Discovery Protocol packet.

7. The networking apparatus of claim 5, where the datagram is part of a protocol that allows a sender of the datagram to request making and/or breaking of the data conduits.

8. The networking apparatus of claim 5, wherein the datagram is a network management or network discovery packet.

9. The networking apparatus of claim 5, wherein the data conduits are reconfigured in response to the datagram.

10. The networking apparatus of claim 5, comprising a crosspoint switch that establishes the data conduits between the communication ports and redirects physical layer signals between interconnected communications ports, the crosspoint switch being integrated with the dynamic routing module.

11. A networking method comprising:
receiving incoming data at a communication port of a plurality of communication ports in a networking apparatus to interface with external computing systems to channel physical layer signals, each of the plurality of communication ports being paired with a corresponding receiver module which is adapted to process incoming data received at an associated communication port, each receiver module including a plurality of matching blocks each paired with a corresponding communication port;
interconnecting communication ports with discrete reconfigurable data conduits, each of the data conduits defining a transmission pathway between the communication ports for physical layer signals;
each matching block processing the incoming data at a higher level than a physical layer;
extracting, with a control block in connection with each matching block, physical layer information from processed data obtained from a respective matching block; and
reconfiguring the data conduits to select the transmission pathway according to the physical layer information.

12. The networking method of claim 11, further comprising routing physical layer signals from the incoming data through the physical layer discrete data conduit to a target communication port.

13. The networking method of claim 11, wherein extracting includes extracting the physical layer information from the processed data to derive data conduit configuration from the incoming data, and reconfiguring includes reconfiguring the data conduits to select the transmission pathway, according to the physical layer information.

14. A system comprising:
a networking apparatus with a plurality of communication ports and a dynamic routing module that reconfigurably interconnects communications ports with a plurality of discrete data conduits, each of the plurality of communication ports being paired with a corresponding receiver module which is adapted to process an incoming data received at the communication port, to select a transmission pathway in a physical layer for the incoming data, each receiver module including a plurality of matching blocks each paired with a corresponding communication port, each matching block configured to process the incoming data at a higher level than a physical layer, and a control block in connection with each matching block, the control block adapted to extract physical layer information from processed data obtained from a respective matching block, and to reconfigure the data conduits to select the transmission pathway according to the physical layer information;
a broadcast server that disseminates information, the broadcast server being interfaced with a service port of the communication ports of the networking apparatus; and
a plurality of client computing systems that receive information from the broadcast server, the client computing systems being interfaced to client communication ports of the networking apparatus,
wherein the plurality of discrete data conduits define transmission pathways between the service port and the client communication ports to facilitate transmission of physical layer signals.

15. The system according to claim 14, wherein the broadcast server comprises a financial broadcast server and the information comprises market information.

16. The system according to claim 14, wherein the control block is adapted to extract physical layer information from the processed data to derive data conduit configuration from the incoming data to reconfigure the data conduits to select the transmission pathway, according to the physical layer information.

17. The system according to claim 16, wherein each receiver module parses the incoming data to extract a datagram that is provided to the control block, and wherein the control block is programmable to identify contents of the datagram for routing of data packets among the data conduits.

18. The system of claim 17, wherein the datagram is a network management or network discovery packet.

19. The networking apparatus of claim 10, wherein the control block:
extracts from the datagram a target hardware address and/or a target protocol address;
determines, using internal tables, a particular communication port of the plurality of communication ports is to be connected to a target communication port corresponding to the target hardware address and/or target protocol address that received an incoming data packet; and
reconfigures the crosspoint switch so that the particular communication port is connected to the target communication port.

20. The networking apparatus of claim 10, wherein the control block is configured to:
extract from payload of the datagram to identify a group address for a target multicast group;
determine a source communication port based on the group address matching an entry in an internal table, the source communication port being a source port for a multicast group associated with the group address; and
reconfigure the crosspoint switch to connect a current communication port where the datagram is received to the source communication port.

21. The networking apparatus of claim 10, wherein the control block is configured to:
parse payload of the datagram to identify a parameter included in a desired port or group field of the payload and indicates a desired communication port of the plurality of communication ports;
authenticates the payload by checking for an authentication key in the payload; and
reconfigures the crosspoint switch to connect a current communication port where the datagram is received to the desired communication port.

* * * * *